United States Patent Office 3,026,586
Patented Mar. 27, 1962

3,026,586
THERMOPLASTIC RESIN FROM CRESYLIC ACIDS AND SHELL MOLDING COMPOSITION THEREFROM
Martin B. Neuworth and Elsio Del Bel, Pittsburgh, Pa., assignors to Consolidation Coal Company, a corporation of Pennsylvania
No Drawing. Filed Nov. 1, 1957, Ser. No. 693,819
23 Claims. (Cl. 22—193)

The present invention relates to a novel thermoplastic phenolic-type novolac resin and to methods for preparing this resin from a heterogeneous mixture of cresylic acids. More particularly, this invention relates to resinuous compositions particularly suitable for use as shell molding compositions.

Resinous phenol-aldehyde condensation products have been known for many years. These phenolic resins usually employ phenol and formaldehyde as starting materials and consist principally of two types: thermosetting and thermoplastic resins. If the resins are prepared using an excess of formaldehyde and with an alkaline catalyst, they resemble the phenol alcohols and have methylol side or end groups. Such resins are often referred to as resoles. They are termed "one-stage" resins and are of the thermosetting type in that the application of heat results in their forming resites, infusible three-dimensional polymers. The "two-stage" or novolac resins are almost invariably prepared with acidic catalysts. They are formed by using an excess of phenol. These novolac resins are phenol-ended chain polymers; they are of the thermoplastic variety and are permanently soluble and fusible. They require the addition of a curing agent in order for cure to be achieved. Ordinarily, if an attempt is made to form a two-stage phenol-formaldehyde resin under typical reaction conditions using phenol in excess, but in the presence of an alkaline catalyst, it is found that only part of the phenol reacts with the formaldehyde. A resole-type one-stage resin is still formed, the excess phenol remaining unreacted. Thus, unless special reaction conditions are employed, such as, for example, prolonged heating for many hours in the absence of any catalyst, a novolac-type resin is prepared only in the presence of an acidic catalyst.

Phenolic resins both of the novolac and resole type have also been prepared from other phenolic isomers and derivatives: for example, from alkyl-substituted phenols such as meta- and para-cresols, 3,5-xylenol, thymol and carvacrol; from polyhydroxy phenols such as resorcinol and pyrocatechol; from aromatic hydroxycarboxylic acids such as salicyclic and cresotinic acids. Attempts have also been made to prepare useful phenolic resins from various distillate fractions of raw cresylic acids. Raw cresylic acids, i.e., tar acids, are those caustic-soluble phenols obtained by the thermal treatment of hydrocarbonaceous materials such as petroleum, coal, lignite, and the like. A raw cresylic acid distillate fraction consists principally of a mixture of phenol, cresols, xylenols, higher-boiling alkyl phenols, and, frequently, organic nitrogen and sulfur compounds. The specific distribution of phenolic isomers present depends upon the origin of the starting material and upon the particular distillate fraction selected. Thus a low-boiling cresylic acid distillate fraction includes those phenolic isomers having a boiling range between about 180 and 230° C. This boiling range includes principally phenol, cresols, xylenols, and monoethylphenols. If some neutral tar acid oils are present as contaminants, the boiling range may be lowered to about 160° C. In the various attempts made to prepare useful synthetic resins from heterogeneous mixtures of raw cresylic acids, two types of tar starting materials have generally been used: either a tar distillate fraction containing a mixture both of cresylic acids and neutral hydrocarbon oils, or a cresylic acid distillate fraction free from any admixed hydrocarbon oils. For example, in U.S. Patent 2,527,065 is described the preparation of a thermosetting phenolic-type resin by the treatment of a mixture of cresylic acids and hydrocarbon oils with paraformaldehyde in the presence of an alkaline catalyst. In the copending application of B. W. Jones and M. B. Neuworth, Serial No. 489,104, filed February 18, 1955, now U.S. Patent 2,931,787, and assigned to the assignee of this invention, a process is described for preparing a thermoplastic phenolic-type resin from a mixture of low-boiling cresylic acids in the presence of an acid catalyst. This latter process results in the production of a novolac-type resin having a preponderance of phenol end groups with relatively few methylol end groups. The resulting resin has a softening point considerably below that produced by the process of the present invention.

It is an object of the present invention to provide a novel thermoplastic two-stage phenolic-type resin.

It is an additional object to provide a thermoplastic phenolic-type resin having an improved high-temperature stability compared with that of thermoplastic phenolic resins heretofore available.

It is yet an additional object to provide a process for treating a distillate fraction of a cresylic acid feedstock whereby the thermoplastic resin of this invention is obtained.

It is still a further object to provide a thermoplastic phenolic-type resin particularly suitable for use as an ingredient in shell-molding compositions.

According to this invention, the novel thermoplastic phenolic-type resin of this invention is obtained by reacting a cresylic acid distillate fraction in the presence of an alkaline condensation catalyst with a molar deficiency of a formaldehyde-yielding material. More specifically, a thermoplastic phenolic-type resin is produced that has a softening point by standard ring and ball apparatus (ASTM designation E28–51T) between 105 and 145° C. This resin is particularly suitable for use in shell molding compositions. It is produced by intercondensing a molar equivalent of a mixture of at least two components having different relative resinification reactivities of a cresylic acid distillate fraction having a boiling range between about 180 and 230° C. with from 0.25 to 0.55 mole of formaldehyde in the presence of an alkali-metal hydroxide. It is particularly preferred that the cresylic acid distillate fraction have a boiling range of at least 30 degrees between 180 and 230° C.

By use of the term "intercondensing" or "intercondensation" to describe the process of this invention for forming a thermoplastic resin, it is desired to point out that the reaction between the cresylic acids and the formaldehyde is seen as occurring in a heterogeneous random manner. Formaldehyde molecules will link different phenolic isomers into the same polymer chain structure. The resultant resin will therefore differ substantially from a resinous mixture of different phenolic isomers that have been individually condensed with formaldehyde and then physically intermixed.

I. THERMOPLASTIC RESIN FROM CRESYLIC ACIDS

The thermoplastic phenolic-type resin obtained in the practice of the present invention is a two-dimensional polymer of the two-stage type; that is, it requires the addition of a curing agent to render it heat-curable or thermosetting. However, it differs from the phenolic novolac-type resins obtained by use of an acid catalyst, such as that obtained in the copending application of Jones and Neuworth previously mentioned, inasmuch as the acid-catalyzed novolac-type resins have a considerably lower softening point. The present resin has a softening point by standard ring and ball apparatus of between 105 and 145° C. This resin of higher softening point is particularly useful in shell molding compositions. The higher softening point is believed due to a greater preponderance of methylol terminal groups on the structure of the thermoplastic resin of this invention as compared with those of conventional novolac-type resins.

Ordinarily, when phenol and formaldehyde are condensed in the presence of an alkaline catalyst, and a molar deficiency (or an excess) of formaldehyde is used, a resole-type thermosetting resin is produced. It was therefore unexpected and surprising to find that when a cresylic acid distillate fraction was intercondensed in the presence of an alkaline catalyst, and a molar deficiency of formaldehyde was used, namely, from 0.25 to 0.55 mole of formaldehyde per mole equivalent of cresylic acids, a phenolic-type thermoplastic resin resulted. While not wishing to be restricted by the explanation profferred, it is believed that the formation of a thermoplastic phenolic-type resin is explained by the fact that a heterogeneous mixture of both substantially inert and reactive cresylic acids is employed as the reactant material. The cresylic acid fraction used contains at least two isomers having differing degrees of reactivity and different reactive positions on the phenolic molecule, and components which are inert insofar as reactivity to form a phenolic resin under the reaction conditions used.

The heterogeneous mixture of cresylic acids thus will include compounds having two reactive hydrogen positions, that is, compounds unsubstituted in the ortho and para positions of the molecule, to compounds that have only one functional position and hence are relatively unreactive. Only a partial resinification of the cresylic acid mixture by intercondensation with formaldehyde will therefore occur under the conditions used. In practicing the present invention, it is hence considered essential that the heterogeneous mixture of low-boiling cresylic acids used, that is, intercondensed with formaldehyde, have at least 25 percent thereof and up to 75 percent recoverable as unreacted cresylic acids. It has been found that the relative resinification reactivities of the phenolic isomers present may vary as much as 50:1. In order of decreasing relative reactivity, as measured by relative rate of disappearance of the phenolic compound, the compounds arrange themselves in the following approximate order: 3,5-xylenol, m-cresol, 3,4-xylenol, 2,5-xylenol, 2,3-xylenol, phenol, p-cresol, o-cresol, 2,4-xylenol, 2,6-xylenol.

The cresylic acid distillate fraction used may be obtained, as raw cresylic acids, from various sources. The term cresylic acids, or tar acids, is generally applied to phenol and its homologs which may include cresols, xylenols, trimethylphenols, ethylphenols, and higher-boiling materials such as dihydroxyphenols, polycyclic phenols and the like. Crescylic acids are obtained from the tar produced by the low-temperature carbonization of coal, lignite and the like, conventional high-temperature coke oven tar, the liquid products of petroleum cracking both thermal and catalytic, shale oil, coal hydrogenation products and the like. Distillate fractions of cresylic acids boiling up to about 230° C. will contain virtually all of the phenol, cresols, xylenols and monoethylphenols in the crude phenolic mixture. Phenol, the lowest boiling member of the homologous series, boils at about 180° C. The distribution of isomers in the distillate fraction of cresylic acids is dependent upon the origin of the raw cresylic acid mixture.

This mixture of cresylic acids can, of course, be separated by fine fractionation into fractions containing relatively pure phenolic isomers or closely boiling isomeric pairs. This invention is applicable to the treatment of such fractions that contain at least two components having different relative resinification reactivities, such as, for example, a mixture of meta- and para-cresols. However, the present invention is primarily directed to a process for preparing novel thermoplastic resins from the entire cresylic acid distillate fraction having a boiling range of at least 30° C. between about 180 and 230° C., without preliminary fine fractionation. While cresylic acid distillate fractions having a boiling range between about 160 and 230° C. may be used, the lowered boiling range, i.e., between 160 and 180° C., is generally due to the presence of certain non-phenolic contaminants. It is preferred for the purposes of the present invention that the cresylic acid mixture be relatively free of the various non-phenolic contaminants. The contaminants normally associated with cresylic acid mixtures are sulfur compounds such as thiophenols and aryl sulfides, nitrogen compounds, tar bases and neutral constituents. There are many processes well known in the art for removing such contaminants from such tar acid mixtures. Where phenol is first removed from the distillate mixture, a tar distillate remains having a boiling range covering the entire range between 190 and 230° C. This distillate fraction is also considered highly suitable for the purposes and practice of this invention.

According to the present process, the cresylic acid distillate fraction, which contains at least cresols, xylenols and monoethylphenols, and preferably phenol in addition, is resinified by intercondensation in the presence of a alkaline catalyst with between 0.25 and 0.55 molar equivalent of a formaldehyde-yielding material. The catalyst is preferably a metal-alkali hydroxide, such as sodium hydroxide. Following neutralization of the alkaline condensation catalyst, the unreacted cresylic acids are recovered by distillation from the reaction mixture. The resulting thermoplastic resin is then recovered separately as a distillation residue.

In a typical run, one molar equivalent of the tar acid distillate fraction is intercondensed with from 0.25 to 0.55 molar equivalent of a formaldehyde-yielding material, such as paraformaldehyde, formalin or the like. It is particularly preferred that from 0.45 to 0.50 mole of formaldehyde be supplied for each molar equivalent of the cresylic acid distillate fraction. It is essential in the practice of this invention in order to obtain a thermoplastic phenolic-type resin having a standard ring and ball softening point between 105 and 145° C. that the intercondensation be carried out in the presence of an alkaline condensation catalyst, preferably a metal-alkali hydroxide. While catalytic amounts of the alkaline condensation catalyst, based on the weight of cresylic acids used, may be as low as 0.1 percent, amounts from 0.5 to 5 percent by weight are preferred. While various alkaline catalysts may be employed, such as sodium hydroxide, barium hydroxide, potassium hydroxide and the like, in general the use of a strong alkaline catalyst such as sodium hydroxide is preferred because of its high degree of effectiveness, its low price and its convenient availability. The formaldehyde, the cresylic acid distillate fraction and the alkaline catalyst are heated together, preferably to reflux conditions, and maintained at a reflux temperature of approximately 100° C. until substantially all the formaldehyde has reacted with the cresylic acids. A reaction time of about one hour is suitable and preferred. While reflux conditions are preferred, corresponding to a temperature of about 100° C., lower temperatures, such as 50° C., may be employed, heating being continued for a correspondingly longer period of time. Following the intercondensation reaction, a stoichiometric quantity of a strong acid such as sulfuric, hydrochloric, phosphoric, or oxalic acid or the like is added to the reaction mixture in order to neutralize the alkaline condensation catalyst. Sulfuric acid is conveniently employed to neutralize a sodium hydroxide catalyst. While the alkaline catalyst may effectively be neutralized by dilution through repeated washing and decantation, it is preferred to use an acid, and particularly a strong mineral acid, to neutralize the catalyst. A final solution having a pH between 5.5 and 7 is satisfactory. After neutralization, the water and unreacted cresylic acids, the latter constituting from 25 to 75 percent by weight of the cresylic acids originally used, may be recovered by distillation under vacuum. The distillation temperature used should be well below 190° C. Following removal of water and unreacted cresylic acids, the formed thermoplastic resin, substantially free from unreacted cresylic acids, may be poured into a container for congelation.

*Example 1.—Cresylic Acid Distillate Fraction*

For purposes of illustration, in Tables I and II are listed typical analyses for several cresylic acid distillate fractions obtained from various sources. The cresylic acid compositions listed in these tables correspond to a fraction of low-boiling cresylic acids having a boiling range of at least 30° between about 180 and 230° C., and are particularly suitable for the practice of this invention. In Table I are shown typical analyses for distillate fractions obtained from several sources.

If the boiling range of the cresylic acid distillate fraction shown in Table I is narrowed to between 190 and 230° C., substantially all the phenol will be removed inasmuch as the boiling point of phenol is approximately 180° C. The distribution of cresols, xylenols and monoethylphenols will, however, still retain approximately their same proportions relative to one another. This distillate fraction over the range of 190 to 230° C. is similarly useful as a reactant material for preparing a thermoplastic phenolic-type resin according to this invention.

TABLE I.—DISTRIBUTION OF PHENOLIC MATERIALS IN CRESYLIC ACID DISTILLATE FRACTIONS

[Boiling range: 180-230° C.]

| Source | High temperature tar | Petroleum cresylics |
|---|---|---|
| Phenol (wt. percent) | 28.4 | 14.2 |
| o-Cresol | 13.8 | 17.4 |
| 2,6-Xylenol | | 0.9 |
| m-Cresol | 23.7 | 17.7 |
| p-Cresol | 12.5 | 8.0 |
| 2,4-Xylenol | 4.5 | 8.0 |
| 2,5-Xylenol | 2.5 | 7.1 |
| 2,3-Xylenol | 1.3 | 2.4 |
| 3,4-Xylenol | 2.8 | 7.5 |
| 3,5-Xylenol | 6.3 | 5.5 |
| m-Ethylphenol | 2.4 | 6.5 |
| p-Ethylphenol | 1.0 | |
| Trimethylphenols | | 4.8 |

In Table II are shown calculated average values of phenolic isomers obtained from petroleum, low-temperature carbonization and American-duty-free imported crude cresylic acids.

TABLE II.—ISOMER ANALYSES OF CRESYLIC ACIDS FROM PETROLEUM, LOW-TEMPERATURE CARBONIZATION AND CRUDE IMPORT SOURCE

| Source | Petroleum | Low-temperature carbonization | Crude import |
|---|---|---|---|
| Isomer: | | | |
| Phenol | 16.3 | 9.9 | 3.2 |
| o-Cresol | 21.0 | 12.6 | 15.3 |
| 2,6-Xylenol | 0.9 | 2.1 | 2.0 |
| m-Cresol | 19.9 | 15.1 | 8.0 |
| p-Cresol | 7.6 | 11.2 | 6.5 |
| o-Ethylphenol | 0.6 | 0.3 | 0.2 |
| 2,4-Xylenol | 6.8 | 12.4 | 13.7 |
| 2,5-Xylenol | 5.3 | 5.9 | 4.8 |
| 2,3-Xylenol | 1.9 | 1.8 | 2.5 |
| m-Ethylphenol | 5.1 | 5.5 | 9.2 |
| p-Ethylphenol | 1.0 | 4.9 | 7.4 |
| 3,5-Xylenol | 6.1 | 4.0 | 8.8 |
| 3,4-Xylenol | 3.5 | 6.5 | 5.9 |
| $C_9$ phenols | 4.1 | 7.7 | 12.5 |
| Totals | 100.1 | 99.9 | 100.0 |

Summary

| | | | |
|---|---|---|---|
| Phenol | 16.3 | 9.9 | 3.2 |
| Cresols | 48.5 | 38.9 | 29.8 |
| Xylenols (inc. monethyl-phenols) | 31.2 | 43.4 | 54.5 |
| Higher-boiling phenols | 4.1 | 7.7 | 12.5 |

Several examples follow of some typical runs made in which the cresylic acid distillate fraction was intercondensed with a molar deficiency of formaldehyde. These examples are considered as exemplary and illustrative of the practice of this invention, and are not to be construed as restrictive of the scope thereof.

*Example 2.—Cresylic Acid/Formaldehyde Ratio of 1:0.25*

One molar equivalent of a cresylic acid distillate fraction distilled from a petroleum-derived raw cresylic acid mixture obtained by the catalytic cracking of petroleum was mixed with 0.25 mole of formaldehyde. Sodium hydroxide, in an amount of 1 percent by weight of the cresylic acid present, was added as catalyst. The isomer distribution of the phenolic components present in the feedstream is shown in the second column of Table III. The mixture was maintained at 100° C. for 60 minutes under continuous stirring. The resulting thermoplastic resin contained 31.2 percent by weight of the cresylic acids in the feed, and had a standard ring and ball softening point of 123° C. The distribution of the recovered unreacted cresylic acids is listed in the third column of Table III. In the fifth column is shown the composition of the resinified constituents.

*Example 3.—Cresylic Acid/Formaldehyde Ratio of 1:0.35*

One molar equivalent of a cresylic acid distillate fraction feedstream of substantially the same composition as that used in Example 2 was intercondensed with 0.35 mole of formaldehyde. Sodium hydroxide, in an amount of 1 percent by weight of the cresylic acid present, was added as catalyst. The mixture was maintained at 100° C. for 60 minutes under continuous stirring. The resulting thermoplastic resin contained 39.8 percent by weight of the cresylic acids of the feedstream and had a softening point by standard ring and ball apparatus of 144° C. The distribution of the recovered unreacted cresylic acids and of the resin is shown in the fourth and sixth columns, respectively, of Table III.

TABLE III.—RESINIFICATION OF PETROLEUM CRESYLIC ACID DISTILLATE FRACTION (180–230° C.)

[Cresylic acid formaldehyde ratios of 1:0.25 and 1:0.35]

| Isomer | Composition of feedstream, wt. percent | Composition of unreacted recovered acids, wt. percent | | Composition of resin, wt. percent | |
|---|---|---|---|---|---|
| | | 1:0.25 [1] | 1:0.35 [1] | 1:0.25 [1] | 1:0.35 [1] |
| Phenol | 18.6 | 21.3 | 20.2 | 18.3 | 19.8 |
| o-Cresol | 14.3 | 25.2 | 27.6 | 10.6 | 9.2 |
| 2,6-xylenol | 0.2 | 1.4 | 2.3 | 0.0 | 0.0 |
| m-Cresol | 20.3 | 15.2 | 15.9 | 25.6 | 22.0 |
| p-Cresol | 7.7 | 11.7 | 11.1 | 0.2 | 2.9 |
| 2,4-xylenol | 6.5 | 5.5 | 9.4 | 0.9 | 0.0 |
| 2,5-xylenol | 5.2 | 5.0 | 2.4 | 7.2 | 10.1 |
| 2,3-xylenol | 2.2 | 2.4 | 1.2 | 5.2 | 6.2 |
| m-Ethylphenol | 4.9 | 4.5 | 2.6 | 4.2 | 6.6 |
| p-Ethylphenol | 0.0 | 0.9 | 2.5 | 1.8 | 0.0 |
| 3,5-xylenol | 8.8 | 1.5 | 0.6 | 12.5 | 11.6 |
| 3,4-xylenol | 5.2 | 4.7 | 4.5 | 0.0 | 0.0 |
| Trimethylphenols | 6.0 | 0.6 | 0.0 | 13.6 | 11.8 |

[1] Molar ratio of cresylic acid feed to formaldehyde.

Example 4.—Cresylic Acid/Formaldehyde Ratio of 1:0.48

A run was made using a petroleum-derived cresylic acid distillate fraction. Two hundred pounds of the distillate fraction having a boiling range from 180 to 230° C. was intercondensed with 69 pounds of formalin (37.5 percent formaldehyde by weight) in a 50-gallon resin kettle. An amount of two pounds of flake sodium hydroxide was added to the kettle as catalyst. The average molecular weight of the cresylic acid isomers was calculated to be 112. The proportions used correspond, therefore, to 0.48 mole formaldehyde per mole feed with a one percent catalyst concentration. Steam was introduced into the reaction vessel, and the reactants were brought to a reflux temperature of 100° C. in 35 minutes. This reflux temperature was maintained for one hour. Thereupon 560 milliliters of concentrated sulfuric acid was introduced into the kettle to neutralize the contents thereof. The reaction products were dehydrated, and unreacted cresylic acids were recovered by distillation under vacuum to an end temperature of 184° C. at 27 inches of vacuum. The distillation required approximately 5 hours. The resin that was produced was recovered from the reaction kettle as a viscous liquid stream and was cooled to a glassy-like thermoplastic resin. The resin had a ring and ball softening point of 128° C. The resin yield was 134 pounds or 67.0 percent by weight of the cresylic acid feed. The unreacted cresylic acid yield was 56 pounds. In this run, some additional unreacted cresylic acids were not recovered from the first distillate fraction, which consists principally of water.

Example 5.—Resin From Low-Temperature Carbonization Cresylics

A molar equivalent of the low-boiling cresylic acid fraction obtained from low-temperature carbonization of bituminous coal was intercondensed with 0.35 mole of formaldehyde in the presence of one percent sodium hydroxide as catalyst. A resin yield of 44 percent was obtained, based on weight of the feedstock; the unreacted acid recovered represented 58.9 percent by weight of the feedstock. The softening temperature of the resin by standard ring and ball apparatus was 138° C. In Table IV is shown the isomeric distribution of phenolic compounds used as feedstock, the composition of the recovered unreacted cresylic acids and the composition of the intercondensed constituents of the resin. In general, standard analytical techniques, including separation by distillation, gas chromatography and infrared spectrophotometric analysis, are employed for the determination of the various cresylic acid fractions. The amount of resinified constituents present in the resin is determined by difference between the initial feedstock and the unreacted recovered cresylic acids.

TABLE IV.—CONDENSATION OF LOW-TEMPERATURE CARBONIZATION CRESYLIC ACIDS

| | Feedstock, wt. percent | Thermoplastic resin obtained, wt. percent | Unreacted recovered cresylic acid, wt. percent |
|---|---|---|---|
| Phenol | 9.6 | 5.9 | 12.9 |
| o-Cresol | 13.4 | 9.1 | 17.2 |
| 2,6-Xylenol | 3.2 | 2.1 | 4.1 |
| m-Cresol | 11.3 | 19.4 | 4.8 |
| p-Cresol | 6.3 | 0.3 | 11.4 |
| 2,4-Xylenol | 18.6 | 15.0 | 20.0 |
| 2,5-Xylenol | 5.1 | 9.6 | 1.4 |
| 2,3-Xylenol | 3.8 | 4.7 | 3.2 |
| m-Ethylphenol | 4.3 | 8.0 | 1.3 |
| p-Ethylphenol | 5.3 | 9.9 | 1.5 |
| 3,4-Xylenol | 3.4 | 6.0 | 1.3 |
| 3,5-Xylenol | 3.6 | 7.4 | 0.6 |
| $C_9$'s | 12.1 | 2.6 | 20.1 |

Example 6.—Resin From Petroleum Cresylic Acids

A cresylic acid distillate fraction having a boiling range between 180 and 230° C. and derived from the catalytic cracking of petroleum was reacted with 0.475 mole of formaldehyde per molar equivalent of the feedstock employed. One percent by weight of sodium hydroxide based on the feedstock was used as catalyst. The reaction was carried out under reflux conditions at a temperature of 100° C. for approximately one hour. A resin yield of 62.4 percent was obtained based on the weight of the feed, with 40.7 percent of unreacted cresylic acids being recovered. The thermoplastic resin had a ring and ball softening point of 126° C. In Table V is shown the isomeric distribution of phenolics used in the feedstock, and the distribution of the intercondensed constituents of the thermoplastic resin obtained and of the unreacted recovered cresylic acids.

TABLE V.—CONDENSATION OF PETROLEUM CRESYLIC ACID DISTILLATE FRACTION

| | Cresylic acid feedstock, wt. percent | Thermoplastic resin, wt. percent | Unreacted recovered cresylic acids, wt. percent |
|---|---|---|---|
| Phenol | 14.2 | 9.5 | 22.5 |
| o-Cresol | 19.4 | 13.0 | 30.8 |
| 2,6-Xylenol | 1.1 | 0.1 | 3.3 |
| m-Cresol | 19.8 | 28.2 | 4.9 |
| p-Cresol | 10.7 | 7.7 | 16.0 |
| 2,4-Xylenol | 4.8 | 0.5 | 12.4 |
| 2,5-Xylenol | 7.8 | 11.2 | 1.6 |
| 2,3-Xylenol | 2.8 | 3.9 | 0.8 |
| m-Ethylphenol | 4.0 | 4.8 | 2.6 |
| p-Ethylphenol | 0.1 | 0.1 | 0.0 |
| 3,4-Xylenol | 4.8 | 7.2 | 0.5 |
| 3,5-Xylenol | 7.4 | 10.8 | 1.3 |
| $C_9$'s | 3.2 | 3.1 | 3.3 |

TABLE VI.—RESINIFIED CRESYLIC ACID CONSTITUENTS IN RESIN

| Resinified cresylic acid constituent | Composition range, wt. percent of resin | Initial feedstock, wt. percent of feed |
|---|---|---|
| Phenol | 5–10 | 9–15 |
| Cresols | 28–50 | 31–50 |
| o-Cresol | 9–13 | |
| m-Cresol | 19–29 | |
| p-Cresol | 0–8 | |
| Xylenols | 25–53 | 28–38 |
| 2,6-Xylenol | 0–2 | |
| 2,3-Xylenol | 3–5 | |
| 2,4-Xylenol | 0–15 | |
| 2,5-Xylenol | 9–12 | |
| 3,4-Xylenol | 6–8 | |
| 3,5-Xylenol | 7–11 | |
| Monoethylphenols | 4–18 | 4–10 |
| m-Ethylphenol | 4–8 | |
| p-Ethylphenol | 0–10 | |
| $C_9$'s | 2–3 | 3–12 |

Example 7.—Average Composition of Resinified Constituents

Based upon the foregoing runs and particularly those reported in Tables IV and V, the average composition of resinified cresylic acid constituents present in the thermoplastic resin may be expressed as shown in Table VI, based upon an averaged feedstock as shown.

TABLE VII.—CONDENSATION OF CRESYLIC ACIDS WITH VARYING AMOUNTS OF FORMALDEHYDE

| 1. Run No. | 1 | 2 | 3 | 4 | 5 | 6 |
|---|---|---|---|---|---|---|
| 2. Formaldehyde per mole feed (moles) | 0.375 | 0.45 | 0.475 | 0.475 | 0.48 | 0.50 |
| 3. Resin yield (wt. percent of feed) | 53.5 | 60.1 | 61.0 | 62.4 | 67.0 | 64.0 |
| 4. Unreacted recovered acids (wt. percent of feed) | | 42.3 | | 40.7 | | 39.5 |
| 5. Ring and ball softening point of resin (° C.) | 105.5 | 120.0 | 125.5 | 126.0 | 128.0 | 135.0 |

Example 8.—Effect of Varying Formaldehyde to Cresylic Acid Ratio

Using the same cresylic acid feedstock shown in the second column of Table V, five additional runs were made. These runs were all conducted using the same ratio of catalyst, namely, one percent sodium hydroxide by weight of feedstock. A reflux temperature of 100° C. was maintained for a period of approximately one hour. The principal variable was the proportion of formaldehyde to cresylic acid feedstock. For comparative purposes, the data of Example 6 have been included in the summary of results of the runs shown in Table VII.

As is apparent from inspecting the results shown in Table VII, the resin softening point appears to be a function of the molar ratio of the formaldehyde to cresylic acid used. Increasing the formaldehyde serves to increase the softening point of the resin as determined by standard ring and ball apparatus. In general, a resin having a softening point between 120 and 130° C. is particularly preferred to yield shell molding compositions having optimal properties.

Example 9.—Effect of Catalyst Concentration

Two intercondensation resinification runs were conducted under typical reaction conditions using a ratio of 0.35 mole formaldehyde per mole equivalent of cresylic acid distillate fraction. The concentration of catalyst was varied. The results obtained were as follows:

| Catalyst | Resin yield, percent | Softening temperature, °C. |
|---|---|---|
| Run 1 | 0.5% NaOH | 49 | 104 |
| Run 2 | 1.0% NaOH | 40 | 144 |

Example 10.—Thermoplastic Nature of Resin

A typical resin produced in accordance with this invention was obtained by the intercondensation of a molar equivalent of a petroleum cresylic acid distillate fraction (180–230° C. range) with 0.35 mole of formaldehyde in the presence of one percent sodium hydroxide as catalyst. At completion of the reaction, unreacted cresylic acids were removed by distillation to a 175° C. end point at 12 mm. pressure. The resin had a softening point of 140° C. by standard ring and ball apparatus.

A sample of the resin was heated to 200° C. and held at this temperature for seven hours. There was no visible increase in the viscosity of the resin and no appreciable change in the softening point of the resin under this prolonged heating treatment.

The thermoplastic resin of the present invention may find utility as an ingredient in an oil-soluble varnish composition for protective coatings. In this regard, the thermoplastic resin of this invention is seen as having better thermal stability than conventional phenol-formaldehyde thermoplastic resins.

These thermoplastic two-stage resins also may find utility as high-temperature molding compositions, for example, for brake linings, or as an abrasive binder, or as a glass-bonding resin, when rendered thermosetting by incorporation of a curing agent therewith. The thermoplastic resin in pulverulent form, at about −200 mesh screen size, may be mixed in the dry state with a suitable quantity of curing agent. From 5 to 20 percent by weight of curing agent based on the weight of the thermoplastic resin results in an eminently satisfactory thermosetting resin having improved high-temperature properties. Many methylene-yielding compounds have been suggested as phenolic curing agents such as, for example, paraformaldehyde; other curing agents associated with reactive methylol groups have been suggested such as dimethylolurea and methylol derivatives of urea-melamine; and still other curing agents such as quinone, chloranil, and hydroformaldehyde aniline and ethylenediamine-formaldehyde products have been proposed; it is preferred, however, to use hexamethylenetetramine as the phenolic curing agent offering the most satisfactory results.

II. SHELL MOLDING COMPOSITIONS

While the thermoplastic resin of this invention and the thermosetting resin derived therefrom are considered useful in the varnish art and for formulating special-type molding powders, they are particularly useful as ingredients in shell molding compositions. In the shell molding process for preparing metal castings, as generally practiced, a sand and a shell resin are blended together to provide a homogeneous mixture. The sand ordinarily used is a high silica content foundry sand, with an American Foundrymen's Society (AFS) fineness range from 70 to 155 (also designated as AFA fineness number). The resin ordinarily employed is a phenol-formaldehyde phenolic resin containing hexamethylenetetramine as a curing agent. A metal pattern is preheated to a temperature between 90 and 400° C., preferably at about 250° C. The shell mold is then prepared by bringing a mixture of the sand and the resin into contact with this heated pattern to fuse the resin and for a period of time sufficient to build up the desired shell thickness. An excess of sand-binder mixture is ordinarily employed, and the unused excess is separated from the shell mold for use in preparing other molds. The shells are then heated at an elevated temperature between 300 and 800° C. until the resin binder sets. Usually, the cure or set time may range from several seconds to several minutes, depending upon the desired cycle and the temperature employed.

The use of the shell molding process for preparing metal castings has spread extensively in the foundry industry. The process is particularly advantageous for the quick and simple production of complicated molds inasmuch as close dimensional tolerances may be readily maintained. In addition, a better finish and lower cleaning costs for the casting result from the use of this process. However, one limitation heretofore existing in the widespread use of the shell molding process has been the cost of the materials used in this process. This is because the sand and the resins used in the shells for shell molding must be considered to be expendable because recovery of the sand is ordinarily uneconomical, and the resins are not reuseable. The cost of the sand, and particularly of the phenolic resin, are, therefore, important factors in restricting the widespread future use of this process. Various attempts have been made to reduce the costs of the shell molding process by using a lower silica-content sand, such as clay-bearing sands, and by using resin-coated sands. Shell compositions containing resin-coated sands generally require a lesser amount of resin compared with compositions in which the sand and resin are blended together. These cost-reducing attempts have not always been uniformly satisfactory. Furthermore, the shells made with phenolic resins as now used tend to be brittle and are unable to withstand a high degree of thermal shock. In addition, these shells are not entirely suitable for the casting of high-melting metals inasmuch as excessive burn-through results with consequent distortion of dimensional tolerances of the cast metal. It has been found that by utilizing the thermoplastic resin of the present invention, a shell molding composition may be prepared having improved resistance to thermal shock and improved high temperature stability. The resultant shells are thereby capable of withstanding temperatures far in excess of those that may be used with conventional phenol-formaldehyde resins. In addition, because a heterogeneous mixture of cresylic acids is used as a starting material rather than a highly purified material such as phenol, the resultant resin may be produced more cheaply.

It has been found that thermoplastic phenolic-type resins having a softening point by standard ring and ball apparatus between 105 and 145° C. are particularly suitable and desirable for use in shell-molding compositions. Especially preferred are those resins having a ring and ball softening temperature between 120 and 130° C. Such resins are produced by the alkaline-catalyzed process of this invention. Attempts to produce suitable acid-catalyzed shell molding resins, using similar molar proportions of reactants and similar reaction conditions as for the alkaline-catalyzed process have proven unsuccessful. These results are shown in Example 11.

*Example 11.—Condensation of Petroleum Cresylic Acids With Formaldehyde Using a One Percent Sulfuric Acid Catalyst*

| Formaldehyde to cresylic acid (molar ratio) | Ring and ball softening point (degrees centigrade) |
| --- | --- |
| 0.35 | 78 |
| 0.47 | 88 |
| 0.6 | 96 |

It is thus apparent from the foregoing results that conventional novolac-type resins prepared from cresylic acid distillate fractions in the presence of an acid catalyst give resins having softening points that are too low for successful use in shell molding compositions.

*Example 12.—Typical Shell Molding Compositions*

In Table VIII are listed several typical compositions according to this invention that are suitable for the preparation of shell molds for casting metals.

TABLE VIII.—RESIN-SAND COMPOSITIONS FOR SHELLS AND CORES

| Components | Shell blend, wt. percent | | | Core blend, wt. percent |
| --- | --- | --- | --- | --- |
| | A | B | C | D |
| Thermoset cresylic resin | 6 | 5 | 4 | 3 |
| Dividing Creek sand | 94 | | | |
| Pennsylvania glass sand | | 95 | 96 | 97 |

The thermoset cresylic resin used in Example 12 was obtained by milling the resin of Example 4 with 10 percent by weight of hexamethylenetetramine. A shell molding composition (A) consisting of 6 percent by weight of the thermoset resin and 94 percent by weight of a 99 percent silica content white sand having grains subangular in shape and an AFS fineness of about 100 (Dividing Creek sand, Cumberland County, N.J.), was prepared. The pattern used was maintained at a temperature of 300° C.; the investment time was 20 seconds. Cure time was 70 seconds at a furnace temperature of 370° C. The resultant shell had an average tensile strength of 242 pounds per square inch (p.s.i.). Strong, satisfactory shells were also obtained with 4 percent and 5 percent blends of the resin with Pennsylvania glass sand (B and C). A dry mix (D) of 3 percent resin and 97 percent Pennsylvania glass sand yielded satisfactory cores at a pattern temperature of 275° C. Cold-coating techniques in which the resin particles are coated with the sand in the presence of a suitable solvent, such as ethanol, may also be used in place of the dry-mix method.

*Example 13.—Mixed Phenol-Formaldehyde and Cresylic Acid-Formaldehyde Novolac Resins*

Because of its high-temperature properties, the cresylic acid-formaldehyde resin, when used as the sole resinous component in the shell molding composition, yields shell molds having improved thermal stability compared with those prepared from conventional phenol-formaldehyde resins. It has also been found that if a certain proportion of a conventional thermoplastic phenol-formaldehyde novolac resin is incorporated with the cresylic-acid-formaldehyde resin, the thermal stability of the resultant shell is superior to that of one prepared from either the phenol-formaldehyde novolac resin or the cresylic acid-formaldehyde resin alone. Surprisingly, addition of the phenol formaldehyde resin to the cresylic acid-formaldehyde resin did not lower, but instead improved, the thermal stability. A suitable range of proportions that may be used for preparing a satisfactory composition is shown in Table IX.

TABLE IX.—MIXED RESIN SHELL MOLDING COMPOSITION

| Materials | Parts by weight | Percent by weight |
| --- | --- | --- |
| a. A particulate inorganic material having a fusing temperature above 750° C. | 4,000 to 200,000 | 91-99.8 (of total) |
| b. A thermoplastic phenolformaldehyde novolac resin. | 80 to 190 | 25-50 (of b and c). |
| c. A thermoplastic intercondensed resinous composition of formaldehyde and of a cresylic acid distillate fraction having a boiling range of at least 30° between 180 and 230° C., the resin having a softening point by standard ring and ball apparatus between 105 and 145° C. | 15 to 285 | 50-75 (of b and c). |
| d. A phenolic curing agent | 20 to 80 | 5-20 (of b, c, and d). |

It is preferred, although not essential, that the resinous components be first intimately blended together and then the curing agent added thereto and thoroughly mixed with the thermoplastic materials. The particulate material is next intimately blended, by use of a muller, for example, with the mixture of resins.

The phenolic thermosetting resin is prepared by first intimately mixing together the two resinous thermoplastic components (*b* and *c*). One of these components consists of the thermoplastic phenol-formaldehyde novolac resin and the second of the components consists of the thermoplastic intercondensed resinous composition of formaldehyde and the cresylic acid distillate fraction. This two-component resinous mixture preferably contains from 25 to 50 percent by weight of the phenol-formaldehyde novolac resin (*b*) and from 75 to 50 percent by weight of the cresylic acid-formaldehyde resin (c). This thermoplastic blend is then intimately mixed with a phenolic curing agent (d) such as hexamethylenetetramine using from 5 to 20 percent by weight of the curing agent and from 95 to 80 percent by weight of the thermoplastic blend, thereby giving a thermosetting two-stage phenolic resin. One part of this thermosetting phenolic resin is then intimately mixed with from 10 to 500 parts of the particulate inorganic material. The mixing may be done in a muller, blender, tumbling barrel, or by using paddle mixer. A metal pattern of the object which is to be cast is heated to a temperature of approximately 250° C. The shell molding composition consisting of the inorganic material blended with the thermosetting resin is then dropped onto the heated pattern from a fixed height. Thereby a definite degree of packing of the composition on the pattern is achieved. After a dwell time or investment time of approximately 15 seconds on the heated pattern, the pattern is inverted and the excess molding composition removed. It is of course essential that the molding composition have sufficient plastic strength for an adherent shell of desired thickness, such as approximately one-half inch, to form on the pattern, so that the shell remains on the pattern firmly attached thereto when the pattern is inverted. After the pattern and adhering shell have been turned over, they are baked together as a unit in an oven at approximately 350° C. until the shell is cured. A period of time from 1 to 1½ minutes is usually sufficient to effect a satisfactory cure. The shell is then stripped from the pattern.

*Example 14.—Improved Thermal Stability of Blended Resin-Sand Mixes*

Measurements of the tensile strength of standard mixes of foundry sand with samples of shell-molding commercial phenol-formaldehyde resins, cresylic acid-formaldehyde resin of this invention, and phenol-formaldehyde cresylic-acid-formaldehyde blends of this invention were made for various cure periods until a definite decrease in strength was obtained. As may be seen from Table X, although the cresylic acid-formaldehyde resin by itself was superior to all of the phenol-formaldehyde resins, the 70 percent cresylic acid-formaldehyde plus 30 percent phenol-formaldehyde resin blend unexpectedly showed better high temperature performance than either resin alone.

In many commercial applications of shell molding resins, a rapid cure time and good hot rigidity of the shell are important, particularly where mass production techniques are involved. Increasing the pattern temperature and the furnace temperature for the cure generally serves to lower the investment time and cure time required. Also, various materials are considered suitable for improving the cure time of resins, and these may be incorporated in the resin together with the curing agent for this purpose where convenient. Among suggested additives are dimethylolurea, boric acid, and organic acids such as oxalic, itaconic, tartaric and citric acids. While these additives vary in their effectiveness depending upon the specific conditions employed, the aforementioned blend of phenol-formaldehyde and cresylic acid-formaldehyde resins provides a satisfactory solution for effecting a rapid cure. Thus it has been found that a shell mold prepared from this blend has a cure cycle time of shorter duration compared with one prepared from the cresylic acid-formaldehyde resin alone. In addition to the improved thermal stability of the shells made from the shell molding composition containing either the cresylic acid-formaldehyde resin alone or a blend of the cresylic acid-formaldehyde resin with the phenol-formaldehyde novolac resin, it has been found that these shells show improved resistance to thermal shock. Thus high-melting metals may be readily poured into these shells without fracturing them.

TABLE X.—THERMAL STABILITY OF VARIOUS SHELL MOLDING RESIN-SAND MIXES

| Cure time (sec.) | Commercial phenol resin I | Commercial phenol resin II | Phenol novolac resin (b) and 10% hexa [1] | Cresylic resin (c) and 10% hexa [1] | Cresylic (c) and phenol novolac (b) and 10% hexa [1] |
|---|---|---|---|---|---|
| | Tensile strength (p.s.i.) | | | | |
| 30 | 240 | 216 | 194 | 79 | 164 |
| 45 | 240 | 161 | 215 | 110 | 192 |
| 60 | 243 | 140 | 225 | 148 | 197 |
| 75 | 256 | 105 | 155 | 187 | |
| 90 | 217 | 88 | 122 | 173 | 241 |
| 105 | 168 | | 109 | 184 | 239 |
| 120 | 169 | | 112 | 176 | 205 |
| 135 | 161 | | 64 | 212 | 231 |
| 150 | 175 | | | 169 | 223 |
| 165 | 145 | | | 180 | 197 |
| 180 | 161 | | | 209 | 192 |
| 195 | 115 | | | 185 | 184 |
| 210 | 75 | | | 148 | 194 |
| 225 | 72 | | | 152 | 192 |
| 240 | | | | | 125 |
| 255 | | | | | 128 |
| 270 | | | | | 80 |

[1] Hexa = hexamethylenetetramine.

The improvement in hot-flex rigidity of these shells is shown by the following data. Three samples were compared: a standard phenol-formaldehyde novolac-formaldehyde, a cresylic acid resin alone, and a blend of cresylic acid resin and phenol-formaldehyde novolac resins (70:30, resp.). It was found that for a cure time of 75 seconds at a pattern temperature of 260° C. and a cure temperature of 425° C., the resultant flex in millimeters, by an arbitrary flex test, was 11.8 millimeters for the cresylic acid-formaldehyde resin and 0.3 to 0.5 for three samples of the blend. The blend samples also showed improved tensile strength. The phenol-formaldehyde resin failed completely at 60 seconds cure and thus was not further tested. The flex test used serves to determine the degree of cure of a shell under various conditions. This test measures the deflection of a standard-size specimen, ¼ x 1 x 8 inches, from the normal under its load. The maximum deflection of the specimen, measured in millimeters, indicates the relative flexibility that a shell would be expected to show under the conditions of the curing cycle used. A minimal value is desirable.

Where the thermoplastic resin used in the shell molding composition is made up of the preferred blend of two resinous thermoplastic components, this may be prepared in various ways. It has been found that pulverizing each resin separately to approximately −200 mesh fineness and then mechanically blending them in a muller or blender until an intimate mixture is obtained produces a satisfactory thermoplastic resinous mixture. To this mixture may then be added from 5 to 20 percent by weight of a phenolic curing agent such as hexamethylenetetramine. All three components may be blended together, or the thermoplastic mix may first be prepared and then the phenolic curing agent added thereto and mixed therein. It has been found that it is particularly desirable in preparing the two-component thermoplastic resin to fuse together the two thermoplastic resins, namely, the phenol-formaldehyde novolac resin and the cresylic acid-formaldehyde novolac resin, and blend them in the fused or molten state. Not all techniques are equally desirable however for effecting this fusion in the molten state. Thus a particularly satisfactory and effective blend results if this molten blending occurs immediately following the preparation of the thermoplastic cresylic acid-formaldehyde resin.

*Example 15.—Melt Technique for Blending Resin*

A cresylic acid distillate fraction of substantially the same composition as that of the feed-stream shown in the second column of Table II was intercondensed with 0.35 mole of formaldehyde per molar equivalent of the cresylic acid. Sodium hydroxide in an amount of one percent by weight of the cresylic acid was added as catalyst. This mixture was maintained at reflux for 60 minutes under continuous stirring. The reflux temperature was approximately 100° C. A stoichiometric quantity of concentrated sulfuric acid was then added to the reaction mixture in order to substantially neutralize the alkaline catalyst. The pH of the resultant solution was between 5.5 and 7. After neutralization, the water present and the unreacted cresylic acids were distilled off from the residue at a pressure of approximately 10 millimeters mercury and at a temperature of 185° C. The formed cresylic acid-formaldehyde resin remained behind as the distillation residue. This formed resin was melted, and immediately thereafter a thermoplastic phenol-formaldehyde novolac resin in a ratio of approximately 1–3 parts of the cresylic acid-formaldehyde resin per part of phenol-formaldehyde novolac resin was added thereto. The two resins were then intimately mixed while in the molten state. The molten mixture of combined thermoplastic resins was poured into container for congelation. The fused solid resin was comminuted to a particle size of approximately −200 mesh by pulverizing in a ball mill. The resin was then combined with suitably powdered hexamethylenetetramine in an amount from 5 to 20 percent by weight of the two-component resin to form a thermosetting resin. An amount of foundry sand of a fineness of 70 on the AFS scale was added thereto so as to incorporate approximately five percent of thermoset resin by weight of sand in the combined resinous mixture. A shell mold was then prepared from this mixture. It was found that this type of hot-blended resin gave superior tensile strength and flex results compared with the dry-blend resin or with other techniques employed for mixing the two resins together.

It will be apparent to those skilled in this art that many variables affect the length of the investment or dwell time, the length of the cure time, and the tensile strength and flexibility of the shell molding resin. Thus the length of the dwell time and the temperature used will determine the thickness of the shell. Where castings are small and the melting temperature of the metal relatively low, the dwell time can of course be reduced to form thinner walls. Similarly, the nature of the resin, its softening point, the amount thereof incorporated with the particulate inorganic material, and the nature of the inorganic material itself will also affect the dwell time, the cure time and the resultant shell characteristics. Also, depending upon the specific demands of the production cycle, the ejection requirements of the mold from the pattern may be variable. Thus the shell mold may be allowed to cool somewhat before having the metal poured upon it. Under other conditions, the mold may be required to have excellent hot rigidity characteristics. It is also apparent that for certain shell mold applications the foundry sand that is ordinarily used may be replaced in all or in part by such materials as silica flour, zirconite flour, fly-ash, coke breeze, powdered alumina, or the like. In general, the sand used in the shell molding composition may be any particulate, inorganic material which does not fuse at temperatures below 750° C. Foundry sands, siliceous in character, having a fineness of at least 70 on the American Foundrymen's Society Fineness Scale are preferred. While clay-free, siliceous round-grained sand is generally preferred, certain subangular high-silica or clay-bearing sands have also been used. The latter clay-bearing sands are particularly feasible for use where the sands are precoated with the resin. Such a technique, in addition to enabling the use of lower grade sands, also allows the use of a lesser amount of resin.

By the term "foundry sand" reference is made to an unbonded sand having a silica content of at least 90 percent. The term "unbonded sand" refers to one containing less than 5 percent of an AFS clay substance. The AFS (or AFA) fineness number refers to that fineness as determined by the standard tests described in "Testing and Grading Foundry Sands," 4th edition, 1938, American Foundrymen's Association, Chicago, Illinois.

It will of course be apparent to those skilled in the shell molding art that the choice of a specific resin having a specific softening point depends upon the application for which the shell mold is to be used. Thus a resin with a high softening point will produce dense shells with less bridging on vertical surfaces, since the sand has a better opportunity to pack than with a resin having a low softening point. Less sand penetration and better casting will generally result. However, where thin mold sections are to be prepared, a resin with a lower softening point may be preferred. As mentioned, the softening point of the resin is a function of the formaldehyde to cresylic acid ratio. In some respects, it also is a function of the specific composition of the cresylic acid feedstream. Furthermore, the softening point may be varied by varying the time required to attain reflux temperature and also by varying the time for which refluxing occurs. Thus, for example, if, in the extreme case, a relatively high formaldehyde to cresylic acid ratio is used and the reactants are brought almost instantaneously to the reflux temperature and neutralized almost immediately, a thermosetting resin may easily result. On the other hand, if both the time required to attain reflux and the reflux time itself are increased, the resin yield is increased but the resulting resin has a lowered softening point. Under these conditions, a low-softening-point resin is obtained even with a relatively high formaldehyde to feed ratio. These varied results are believed due to the fact that the various components of the cresylic acid mixture have different resinification rates and different equilibrium resinification times.

*Example 16.—Effect of Reflux Time on Resin Softening Temperature*

In Table XI is shown an example of the effect of the influence of reflux time and time to be brought to reflux upon the softening point of the resin as measured by standard ring and ball apparatus, using standard alkaline catalysis reaction conditions.

TABLE XI.—REFLUX TIMES AND RESIN SOFTENING TEMPERATURE
[Sodium hydroxide catalyst]

| Run No. | Time to attain reflux (min.) | Reflux time (min.) | Formaldehyde to feed ratio (mole/mole) | Resin yield (wt. percent of feed) | Softening point of resin (ring ° C.) |
|---|---|---|---|---|---|
| 1 | 38 | 0 | 0.50 | 61.4 | Thermoset |
| 2 | 29 | 30 | 0.50 | 63.4 | Thermoset |
| 3 | 33 | 60 | 0.50 | 65.0 | 134 |
| 4 | 35 | 90 | 0.50 | 68.8 | 118 |
| 5 | 53 | 60 | 0.50 | 65.9 | 128 |
| 6 | 37 | 0 | 0.43 | 56.7 | 127 |
| 7 | 116 | 0 | 0.43 | 58.5 | 117 |

The softening point by ring and ball apparatus used herein is a convenient test procedure for determining the softening point of materials such as asphalts, tars, pitches, resins and the like. In general, such materials do not have a softening point at a definite temperature. As the temperature rises, these materials gradually and imperceptibly change from brittle or exceedingly thick and slow-flowing materials to softer and less viscous liquids. For this reason determination of the softening point is made by a fixed, arbitrary, and closely defined method. In general, this softening point is defined as the temperature at which a disk of the sample held within a horizontal ring is forced downward a distance of one inch under the weight of a steel ball as the sample is heated at a prescribed rate in a water or glycerine bath. The procedure followed corresponds to ASTM designation E28–51T as promulgated by the American Society for Testing Materials, Philadelphia, Pennsylvania.

While various specific thermoplastic novolac resins have been prepared from cresylic acids and various methods have been described therefor and for obtaining useful shell molding compositions therefrom, it is of course apparent to those skilled in this art that many modifications may be made in the procedures described without departing from the basic principles and spirit of this invention. Thus the cresylic acid distillate fraction employed cannot be considered as having a definite stoichiometric chemical composition, but represents a heterogeneous mixture of various phenolic isomers boiling within a specific distillation range. In a similar manner, while the shell molding compositions have been described with particular reference to use as shell molds, it is considered equally apparent that they may be utilized for producing either resinous shell cores or more conventional resinous solid cores. Thus the shell molding compositions described herein may be readily adapted to the blowing of shell cores. For such purposes, a resin-coated sand is preferable. Various methods are known and employed to coat individual particles of sand with resin in which either muller-type equipment and liquid- or dry-coating techniques are used. It is considered apparent that these modifications are readily available to those skilled in this art and may be applied utilizing the compositions described herein or modified to meet specific requirements. It is therefore to be understood that it is not intended to restrict the herein-described invention by the illustrative examples given, but the scope of this invention is to be determined in accordance with the objects and claims thereof.

We claim:

1. A thermoplastic phenolic novolac resin having a softening point by standard ring and ball apparatus between 105 and 145° C. comprising an intercondensed resinous composition of formaldehyde and between one and one and a half molar equivalents, per mole of formaldehyde, of a distillate fraction consisting essentially of cresylic acids, said fraction having a boiling range of at least 30 degrees between 180 and 230° C.

2. A thermoplastic phenolic novolac resin having a softening point by standard ring and ball apparatus between 105 and 145° C. comprising an intercondensed resinous composition of formaldehyde and between one and one and a half molar equivalents, per mole of formaldehyde, of a mixture consisting essentially of cresylic acids including phenol, cresols, xylenols, and monoethylphenols.

3. A thermoplastic phenolic novolac resin having a softening point by standard ring and ball apparatus between 105 and 145° C. comprising an intercondensed resinous composition of formaldehyde and between one and one and a half molar equivalents, per mole of a formaldehyde, of a mixture consisting essentially of phenolic compounds, said composition containing a phenolic resinified constituents, based on weight percent thereof, from 5 to 10 percent phenol, from 28 to 50 percent cresols, from 25 to 53 percent xylenols, and from 4 to 18 percent monoethylphenols.

4. A thermosetting phenolic resin comprising in intimate admixture from 5 to 20 percent by weight of a phenolic curing agent and from 95 to 80 percent by weight of a thermoplastic phenolic novolac resin having a softening point by standard ring and ball apparatus between 105 and 145° C., said thermoplastic resin comprising an intercondensed resinous composition of formaldehyde and between one and one and a half molar equivalents, per mole of formaldehyde, of a mixture consisting essentially of cresylic acids including phenols, cresols, xylenols, and monoethylphenols.

5. A thermosetting phenolic resin comprising in intimate admixture from 5 to 20 percent by weight of hexamethylenetetramine and from 95 to 80 percent by weight of a thermoplastic phenolic novolac resin having a softening point by standard ring and ball apparatus between 105 and 145° C., said thermoplastic resin comprising an intercondensed resinous composition of formaldehyde and between one and one and a half molar equivalents, per mole of formaldehyde, of a mixture consisting essentially of cresylic acids including phenol, cresols, xylenols, and monoethylephenols.

6. A thermosetting phenolic resin comprising in intimate adixture from 5 to 20 percent by weight of hexamethylenetetramine and from 95 to 80 percent by weight of a thermoplastic phenolic novolac resin having a softening point by standard ring and ball apparatus between 105 and 145° C., said thermoplastic resin comprising an intercondensed resinous composition of formaldehyde and between one and one and a half molar equivalents, per mole of formaldehyde, of a mixture consisting essentially of phenolic compounds, said resinous composition containing as resinified phenolic constituents, based on weight percent thereof, from 5 to 10 percent phenol, from 28 to 50 percent cresols, from 25 to 53 percent xylenols, and from 4 to 18 percent monoethylphenols.

7. A thermoplastic phenolic novolac resin having a softening point by standard ring and ball apparatus between 105 and 145° C. comprising an intercondensed resinous composition of formaldehyde and between one and one and a half molar equivalents, per mole of formaldehyde, of a mixture consisting essentially of phenolic compounds, said resinous composition containing as resinified phenolic constituents, based on weight percent thereof, from 5 to 10 percent phenol, from 9 to 13 percent o-cresol, from 19 to 29 percent m-cresol, from 0 to 8 percent p-cresol, from 3 to 5 percent 2,3-xylenol, from 0 to 15 percent 2,4-xylenol, from 9 to 12 percent 2,5-xylenol, from 6 to 8 percent 3,4-xylenol, from 7 to 11 percent 3,5-xylenol, from 4 to 8 percent m-ethylphenol, and from 0 to 10 percent p-ethylphenol.

8. A thermosetting phenolic resin comprising in intimate admixture from 5 to 20 percent by weight of hexamethylenetetramine and from 95 to 80 percent by weight of thermoplastic phenolic novolac resin having a softening point by standard ring and ball apparatus between 105 and 145° C., said thermoplastic resin comprising an intercondensed resinous composition of formaldehyde and between one and one and a half molar equivalents, per mole of formaldehyde, of a mixture consisting essentially of phenolic compounds, said resinous composition containing as resinified phenolic constituents, based on weight percent thereof, from 5 to 10 percent phenol, from 9 to 13 percent o-cresol, from 19 to 29 percent m-cresol, from 0 to 8 percent p-cresol, from 3 to 5 percent 2,3-xylenol, from 0 to 15 percent 2,4-xylenol, from 9 to 12 percent 2,5-xylenol, from 6 to 8 percent 3,4-xylenol, from 7 to 11 percent 3,5-xylenol, from 4 to 8 percent m-ethylphenol, and from 0 to 10 percent p-ethylphenol.

9. The method for preparing a thermoplastic phenolic novolac resin by a partial resinification of a distillate fraction consisting essentially of cresylic acids, said fraction having a boiling range of at least 30° between 180 and 230° C., comprising reacting in the presence of from 0.1 to 5 percent by weight of a nonvolatile alkaline condensation catalyst one molar equivalent of said cresylic acids with a quantity of a formaldehyde-yielding condensing material yielding from 0.25 to 0.55 molar equivalent of formaldehyde until substantially all said formaldehyde is consumed by intercondensation with from 25 to 75 percent by weight of said cresylic acids to form said thermoplastic resin, neutralizing said alkaline catalyst by addition of acid thereto, distilling off the ureacted cresylic acids from the formed resin at a temperature below 190° C., and recovering the formed resin as a distillation residue.

10. The method for preparing a thermoplastic phenolic novolac resin by the partial resinification of a mixture consisting essentially of cresylic acids containing phenol, ortho-, meta-, and para-cresols, 2,3-, 2,4-, 2,5-, 3,4-, and 3,5-xylenols, and meta- and para-ethylphenols, comprising intercondensing one molar equivalent of said cresylic acids with from 0.45 to 0.50 mole of formaldehyde in the presence of from 0.5 to 5 percent sodium hydroxide by weight of said cresylic acids until substantially all said formaldehyde is consumed by intercondensation with from 25 to 75 percent by weight of said cresylic acids to form said thermoplastic resin, neutralizing the sodium hydroxide to a pH between 5.5 and 7 by addition of a strong acid thereto, distilling off the unreacted cresylic acids at a temperature below 190° C., and recovering the formed resin as a distillation residue.

11. The method according to claim 10 wherein the initial mixture consisting essentially of cresylic acids contains, based on weight percent thereof, from 9 to 15 percent phenol, from 31 to 50 percent cresols, from 28 to 38 percent xylenols, and from 4 to 10 percent monoethylphenols.

12. A thermoplastic phenolic novolac resin comprising a blend of a thermoplastic phenol-formaldehyde novolac resin and a thermoplastic intercondensed resinous composition of formaldehyde and a distillate fraction consisting essentially of cresylic acids, said fraction having a boiling range of at least 30 degrees between 180 and 230° C.

13. A thermoplastic phenolic novolac resin comprising a blend of from 25 to 50 percent by weight of said blend of a thermoplastic phenol-formaldehyde novolac resin and from 75 to 50 percent by weight of said blend of a thermoplastic intercondensed resinous composition of formaldehyde and a distillate fraction consisting essentially of cresylic acids, said fraction having a boiling range of at least 30 degrees between about 180 and 230 C.

14. In the method for preparing a thermoplastic resinous mixture for use in a shell molding composition, wherein a thermoplastic cresylic acid-formaldehyde resin having a softening point by standard ring and ball apparatus between 105 and 145° C. is formed by intercondensing from 0.25 to 0.55 mole formaldehyde with a molar equivalent of a distillate fraction consisting essentially of cresylic acids, said fraction having a boiling range of at least 30 degrees between 180 and 230° C., in the presence of a nonvolatile condensation catalyst until substantially all said formaldehyde is consumed by intercondensation with a portion of said cresylic acids to form said thermoplastic resin, in combination therewith the steps comprisnig neutralizing said alkaline catalyst to a pH between 5.5 and 7 after said resin is formed, distilling off the unreacted acids at a temperature below 190° C., the formed resin remaining as a distillation residue, maintaining said cresylic acid-formaldehyde resin in a molten state, intimately combining therewith in said molten state a thermoplastic phenol-formaldehyde novolac resin in a ratio of 1 to 3 parts of cresylic acid-formaldehyde resin per part of phenol-formaldehyde resin, cooling said fused mixture of resins to form a solid, and comminuting said solid to a particle size suitable for incorporation in a shell molding composition.

15. The method according to claim 14 wherein said solid has a softening point by standard ring and ball apparatus between 120 and 130° C.

16. A thermosetting composition suitable for the preparation of shell molds for casting molten metals, comprising from 10 to 500 parts of a particulate inorganic material having a fusing temperature about 750° C. and one part of a thermosetting phenolic resin containing in intimate admixture from 5 to 20 percent by weight of a phenolic curing agent and from 95 to 80 percent by weight of a thermoplastic intercondensed resinous composition of formaldehyde and a distillate fraction consisting essentially of cresylic acids, said fraction having a boiling range of at least 30 degrees between 180 and 230° C., said thermoplastic resin having a softening point by standard ring and ball apparatus between 105 and 145° C.

17. A thermosetting composition suitable for the preparation of shell molds for casting molten metals comprising from 10 to 100 parts of foundry sand of at least 70 AFS fineness and one part of a thermosetting phenolic resin containing in intimate admixture from 5 to 20 percent by weight of hexamethylenetetramine and from 95 to 80 percent by weight of a thermoplastic intercondensed resinous composition of formaldehyde and a distillate fraction consisting essentially of cresylic acids, said fraction having a boiling range of at least 30 degrees between 180 and 230° C., said thermoplastic resin having a softening point by standard ring and ball apparatus between 120 and 130° C.

18. A composition according to claim 17, wherein said cresylic acids include phenol, cresols, xylenols, and monoethylphenols.

19. A thermosetting composition suitable for the preparation of shell molds for casting molten metals, comprising from 10 to 500 parts of a particulate inorganic material having a fusing temperature above 750° C. and one part of a thermosetting phenolic resin containing in intimate admixture from 5 to 20 percent by wieght of a phenolic curing agent and from 95 to 80 percent by weight of an intimate admixture of two resinous thermoplastic components, the first of said components consisting of a thermoplastic phenol-formaldehyde novolac resin and the second of said components consisting of a thermoplastic intercondensed resinous composition of formaldehyde and a distillate fraction consisting essentially of cresylic acids, said fraction having a boiling range of at least 30 degrees between 180 and 230° C., said second thermoplastic component having a softening point by standard ring and ball apparatus between 105 and 145° C.

20. A composition according to claim 19 wherein said two-component resinous mixture contains from 25 to 50 percent by weight thereof of said first component and from 75 to 50 percent by weight thereof of said second component.

21. A composition according to claim 19 wherein the softening point by standard ring and ball apparatus of said mixture of two resinous thermoplastic components is between 120 and 130° C.

22. The process for preparing shell molds for casting molten metals comprising intimately mixing together from 4000 to 200,000 parts of a particulate inorganic material having a fusing temperature above 750° C., from 20 to 80 parts of a phenolic curing agent, from 80 to 190 parts of a pulverulent thermoplastic phenolformaldehyde novolac resin, from 160 to 285 parts of a pulverulent thermoplastic intercondensed resinous composition of formaldehyde and a distillate fraction consisting essentially of cresylic acids, said fraction having a boiling range of at least 30 degrees between 180 and 230° C., said intercondensed resin having a softening point by standard ring and ball apparatus between 105 and 145° C., pouring an excess of the mixture onto a pattern preheated to from 90 to 400° C., maintaining the mixture in contact with the heated pattern until a shell is formed, removing excess mixture, heating the shell and pattern to from 300 to 800° C. to set the resinous mixture, and separating the shell from the pattern.

23. The process for preparing shell molds for casting molten metals comprising intimately mixing together from 4000 to 200,000 parts of an unbonded foundry sand having an AFS fineness range from 70 to 155 and having a fusing temperature above 750° C., from 20 to 80 parts of hexamethylenetetramine, from 80 to 190 parts of a pulverulent thermoplastic phenol-formaldehyde novolac resin, from 160 to 285 parts of a pulverulent thermoplastic intercondensed resinous composition of formaldehyde and a distillate fraction consisting essentially of cresylic acids, said fraction having a boiling range of at least 30 degrees between 180 and 230°

C., said intercondensed resin having a softening point by standard ring and ball apparatus between 105 and 145° C., pouring an excess of the mixture onto a pattern preheated to from 90 to 400° C., maintaining the mixture in contact with the heated pattern until a shell is formed, removing excess mixture, heating the shell and pattern to from 300 to 800° C. to set the resinous mixture, and separating the shell from the pattern.

References Cited in the file of this patent

UNITED STATES PATENTS

| | | |
|---|---|---|
| 1,214,414 | Berend | Jan. 30, 1917 |
| 1,982,651 | Florenz | Dec. 4, 1934 |
| 2,010,773 | Burke et al. | Aug. 6, 1935 |
| 2,289,478 | Brown | July 14, 1942 |
| 2,383,430 | Weltman | Aug. 21, 1945 |
| 2,617,785 | Pritchett et al. | Nov. 11, 1952 |
| 2,706,188 | Fitko et al. | Apr. 12, 1955 |
| 2,715,114 | Huck | Aug. 9, 1955 |

OTHER REFERENCES

Phenoplasts, Interscience Publishers Inc., N.Y., published 1947, pp. 31–32.

UNITED STATES PATENT OFFICE
CERTIFICATE OF CORRECTION

Patent No. 3,026,586　　　　　　　　　　　　　　March 27, 1962

Martin B. Neuworth et al.

It is hereby certified that error appears in the above numbered patent requiring correction and that the said Letters Patent should read as corrected below.

Column 3, line 74, for "Crescylic" read -- Cresylic --; column 4, line 45, for "a" read -- an --; column 12, Table IX, column 2, line 3 thereof, for "15 to 285" read -- 160 to 285 --; column 13, line 11, after "using" insert -- a --; column 16, Table XI, in the heading to column 6 thereof, before "°C." insert -- and ball, --; column 17, line 55, for "a" read -- as --; column 18, line 8, for "adixture" read -- admixture --; column 19, line 47, for "comprisnig" read -- comprising --; line 65, for "about" read -- above --; column 20, line 23, for "wieght" read -- weight --.

Signed and sealed this 10th day of July 1962.

(SEAL)
Attest:

ERNEST W. SWIDER　　　　　　　　　　　　　DAVID L. LADD
Attesting Officer　　　　　　　　　　　　　Commissioner of Patents